United States Patent
Harding et al.

(10) Patent No.: US 9,551,573 B1
(45) Date of Patent: Jan. 24, 2017

(54) PROXIMITY BASED GESTURING DEVICES, SYSTEMS AND METHODS

(71) Applicant: Creator Technology B.V., Tilburg (NL)

(72) Inventors: Richard Harding, Chandler, AZ (US); John B. Foreman, Edmonds, WA (US)

(73) Assignee: Creator Technology B.V, Tilburg (NL)

( * ) Notice: Subject to any disclaimer, the term of this patent is extended or adjusted under 35 U.S.C. 154(b) by 195 days.

(21) Appl. No.: 14/540,202

(22) Filed: Nov. 13, 2014

Related U.S. Application Data

(63) Continuation of application No. 13/734,590, filed on Jan. 4, 2013, now Pat. No. 8,892,397, which is a continuation of application No. 12/767,690, filed on Apr. 26, 2010, now Pat. No. 8,355,887.

(60) Provisional application No. 61/172,376, filed on Apr. 24, 2009.

(51) Int. Cl.
  G06F 19/00 (2011.01)
  G01B 21/16 (2006.01)
  G06F 3/041 (2006.01)

(52) U.S. Cl.
  CPC .............. *G01B 21/16* (2013.01); *G06F 3/041* (2013.01)

(58) Field of Classification Search
  CPC .... H01L 2924/0002; A61B 18/20; A61B 8/12
  USPC ................. 702/158, 160, 182–185
  See application file for complete search history.

(56) References Cited

U.S. PATENT DOCUMENTS

| | | | |
|---|---|---|---|
| 8,372,726 B2* | 2/2013 | de Graff | H01L 27/14618 257/786 |
| 2006/0161871 A1 | 7/2006 | Hotelling et al. | |
| 2006/0244738 A1 | 11/2006 | Nishimura et al. | |
| 2009/0002339 A1 | 1/2009 | Reynolds et al. | |
| 2009/0088204 A1 | 4/2009 | Culbert et al. | |
| 2009/0187375 A1 | 7/2009 | Kinoshita et al. | |
| 2010/0149126 A1 | 6/2010 | Futter | |
| 2010/0201647 A1 | 8/2010 | Verweg | |
| 2012/0046906 A1 | 2/2012 | Alameh et al. | |

OTHER PUBLICATIONS

USPTO Non-Final Rejection for U.S. Appl. No. 12/767,690 dated Jun. 4, 2012; 10 pages.
USPTO Notice of Allowance and Fees Due for U.S. Appl. No. 12/767,690 dated Oct. 25, 2012; 5 pages.

(Continued)

*Primary Examiner* — Edward Raymond
(74) *Attorney, Agent, or Firm* — Jianq Chyun IP Office

(57) ABSTRACT

A device includes sensor substantially coplanar with one another in a sensor plane, each sensor generating a sense value that varies according to a physical distance between the sensor and an object. The device also includes control circuits configured to generate a first position value, a second position value, and a third value using the sense values in a first mode to detect a hover or glove operation by the object. The first position value and the second position values identify a two-dimensional position of the object in the sensor plane and the third value varies in response to movement of the object in a Z-direction substantially perpendicular to the sensor plane. The control circuits are also configured to generate a fourth position value and a fifth position value in a second mode to detect a touch operation by the object. The control circuits include a programmable integrated circuit including an analog portion and a digital portion.

20 Claims, 16 Drawing Sheets

(56) References Cited

OTHER PUBLICATIONS

USPTO Notice of Allowance for U.S. Appl. No. 13/734,590 dated Aug. 20, 2014; 8 pages.
USPTO Notice of Allowance for U.S. Appl. No. 13/734,590 dated Sep. 17, 2014; 5 pages.

* cited by examiner

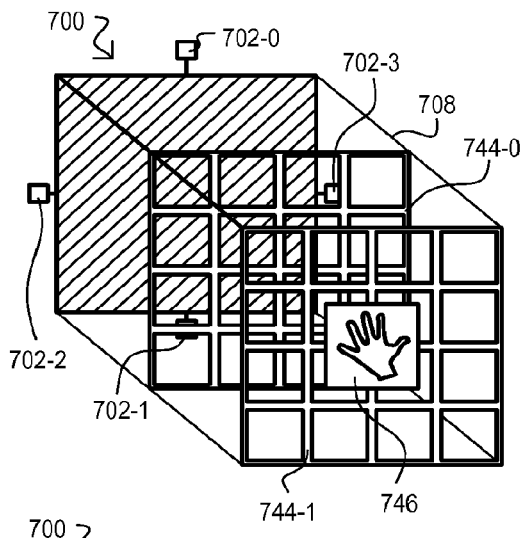 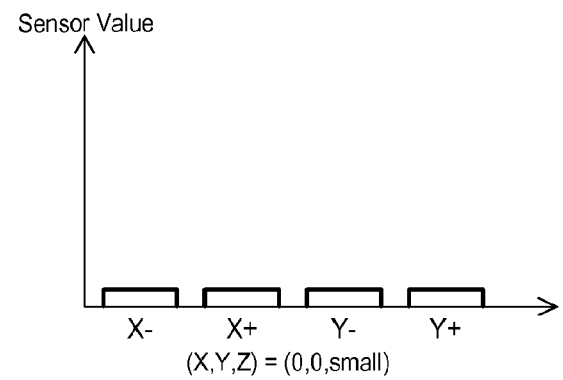
FIG. 7A
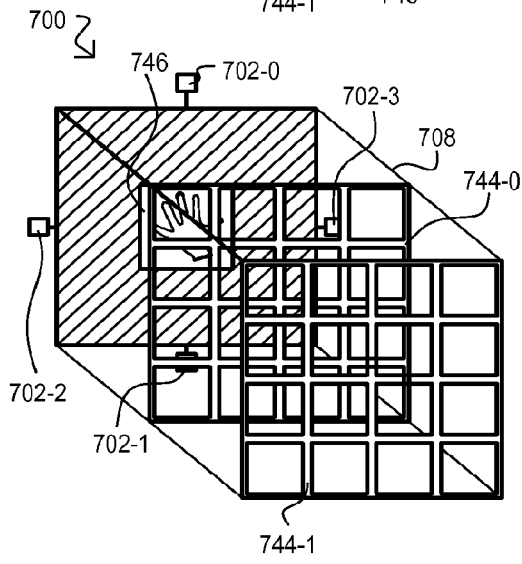 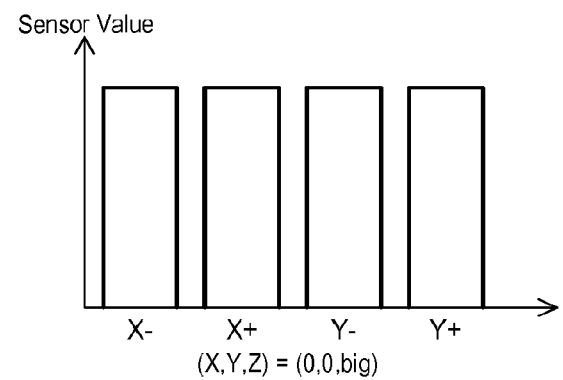
FIG. 7B
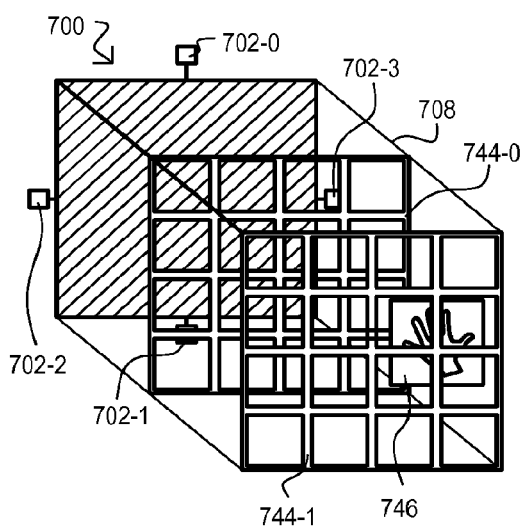 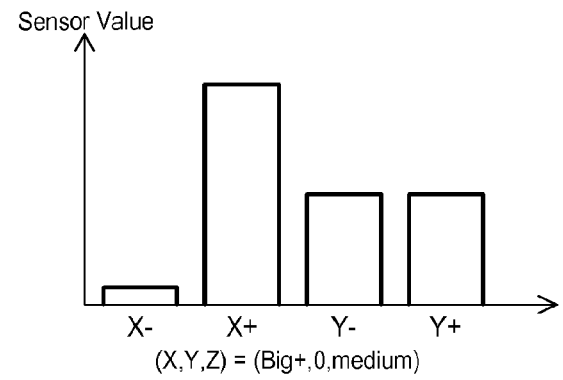
FIG. 7C

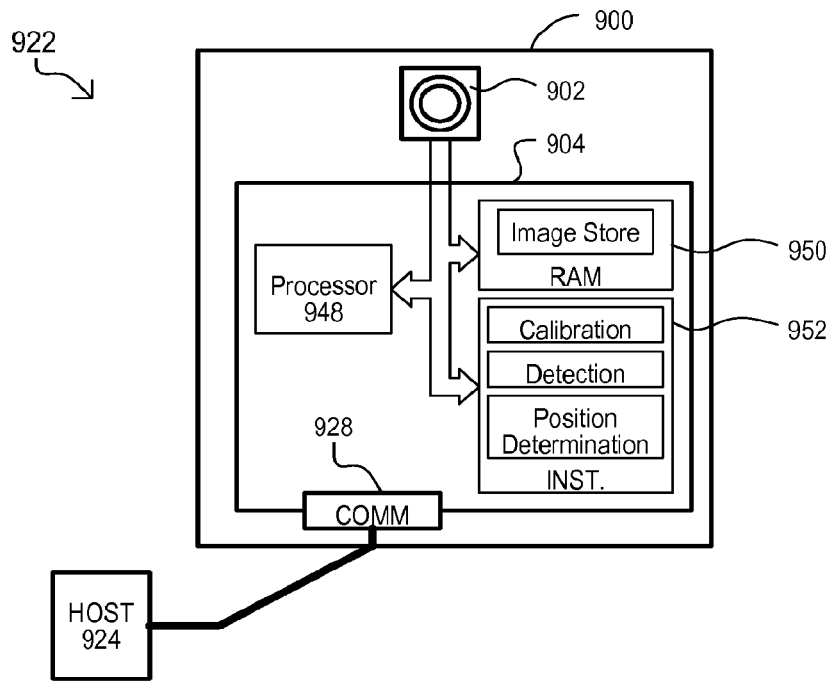
FIG. 9
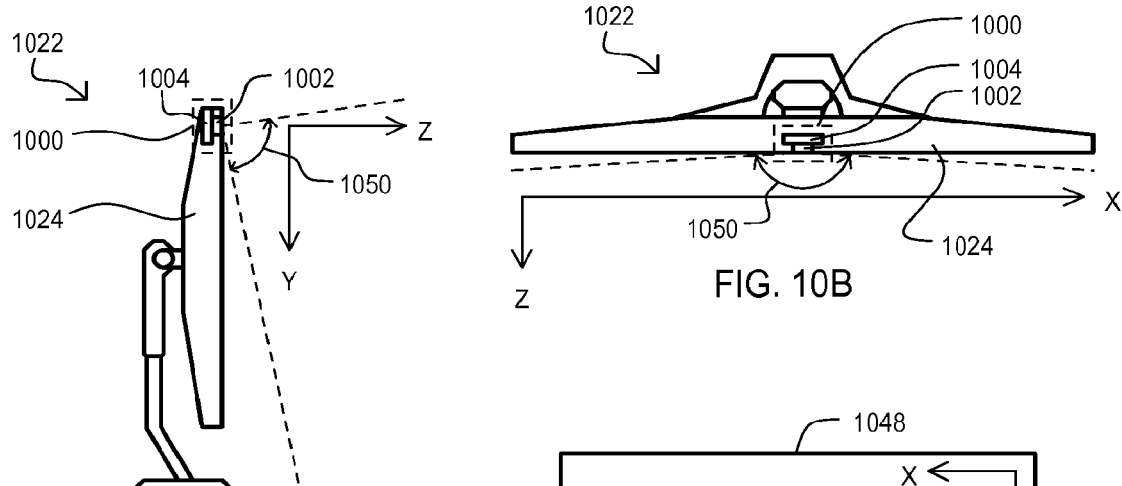
FIG. 10A
FIG. 10B
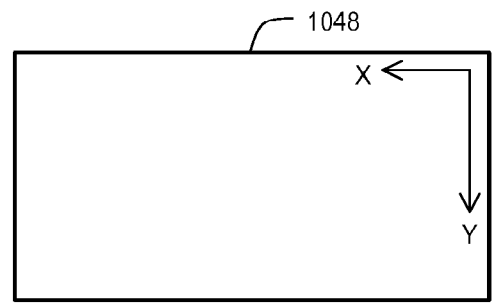
FIG. 10C

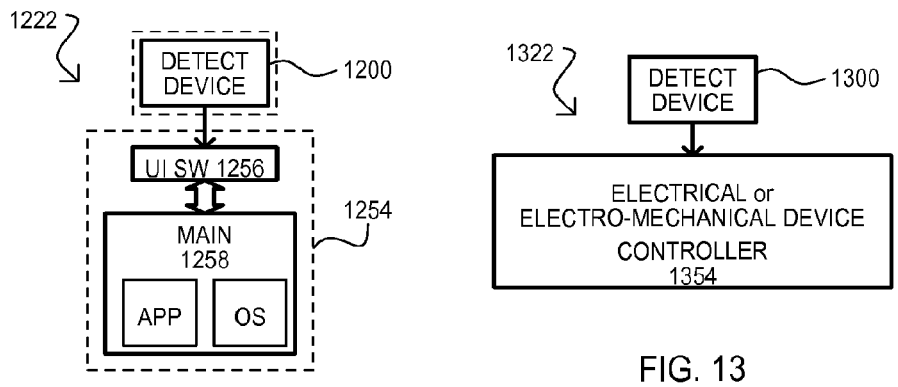
FIG. 12
FIG. 13
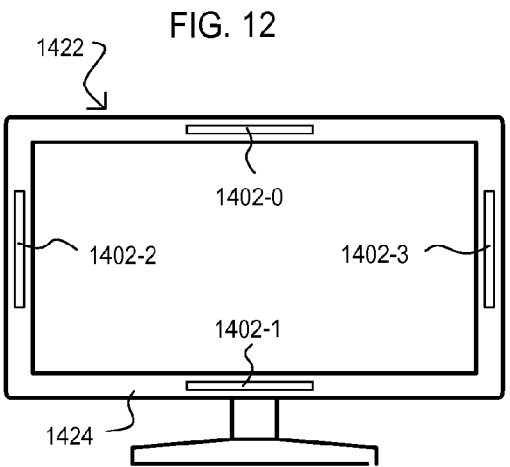
FIG. 14
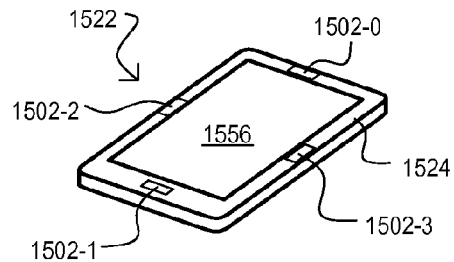
FIG. 15
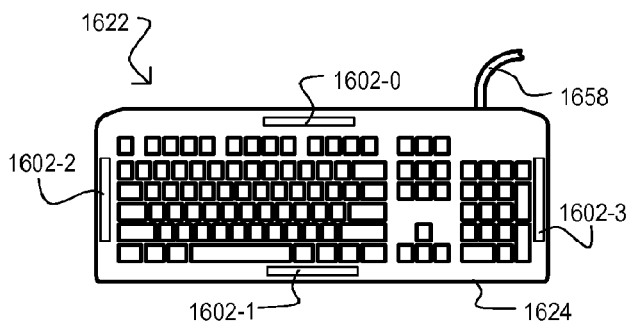
FIG. 16
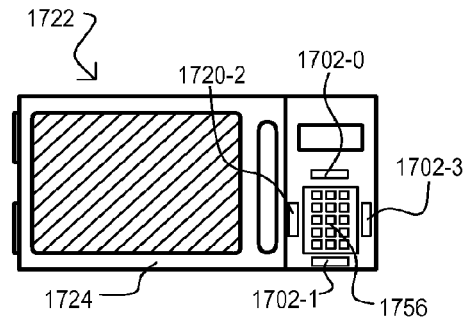
FIG. 17

```
#define RESOLUTION_INCREASE 4
#define NEGATIVE_THRESHOLD 10
#define PROX_THRESHOLD 250
define PROX_HYSTERESIS 100 define XY_RESOLUTION 9//2^(XY_RESOLUTION+1)
define Z_DIVSOR 0 char proximityFlag;

void main ()
{
    // Start up analog and digital blocks
    M8c_EnableGInt;
    EzI2Cs_1_SetRamBuffer(sizeof(MyI2C_Regs), 0, (BYTE *) &MyI2C_Regs);
        EzI2Cs_1_Start();
        CSD_Start();
        CSD_InitializeBaselines() ; // scan all sensors first time, init baseline
        CSD_SetDefaultFingerThresholds();  // initialize baselines and filters
        swTimer = START_DELAY;
        // main loop
    while(1)
        {
            CSD_ScanAllSensors(); // scan all sensors in array (buttons and sliders)
            for (i=0;i<4;i++) // four channels of left right up down
                {
                    //counts filter
                    temp = realCounts[i];
                    temp >>= COUNTS_FILTER;
                    realCounts[i] -= temp;
                    realCounts[i] += CSD_waSnsResult[i];
                    temp = realCounts[i];
                    temp >>= (COUNTS_FILTER - RESOLUTION_INCREASE);
                    CSD_waSnsResult[i] = temp;
                    //baseline filter
                    temp = realBaseline[i];
                    temp >>= BASELINE_FILTER;
                    realBaseline[i] -= temp;
                    realBaseline[i] += CSD_waSnsResult[i];
                    CSD_waSnsResult[i] = temp;
                    temp2 = CSD_waSnsBaseline[i];
```

FIG. 20A

```
        temp2 -= CSD_waSnsResult[i];
        if (temp2 > NEGATIVE_THRESHOLD)
            {
            realBaseline[i] = CSD_waSnsResult[i];
            realBaseline[i] <<= BASELINE_FILTER;
            }
        if (swTimer)
            {
            swTimer--;
            realBaseline[i] = CSD_waSnsResult[i];
            realBaseline[i] <<= BASELINE_FILTER;
            }
        // take a difference
        if (CSD_waSnsResult[i] > CSD_waSnsBaseline[i])
            CSD_waSnsDiff[i] = CSD_waSnsResult[i] - CSD_waSnsBaseline[i]
        else
            CSD_waSnsDiff[i] = 0;
        }

// assign raw values to I2C debug outputs
    M8C_DisableGInt;
    MyI2C_Regs.left = CSD_waSnsDiff[0];
    MyI2C_Regs.down = CSD_waSnsDiff[2];
    MyI2C_Regs.right = CSD_waSnsDiff[3];
    MyI2C_Regs.up = CSD_waSnsDiff[1];
    MyI2C_Regs.rawLeft = CSD_waSnsResult[0];
    MyI2C_Regs.rawDown = CSD_waSnsResult [2];
    MyI2C_Regs.rawRight = CSD_waSnsResult [3];
    MyI2C_Regs.rawUp = CSD_waSnsResult [1];

// calculate "z" axis
    temp = MyI2C_Regs.left + MyI2C_Regs.right + MyI2C_Regs.up + MyI2C_Regs.down;
    temp >>= Z_DIVSOR;
    MyI2C_Regs.zDir = temp // detect if hand is present
    if (MyI2C_Regs.zDir > (PROX_THRESHOLD + PROX_HYSTERESIS))
        proximityFlag = 1
    if (MyI2C_Regs.zDir < (PROX_THRESHOLD - PROX_HYSTERESIS))
```

FIG. 20B

```
        {
        proximityFlag = 0;
        }
    // calculate and post x,y information if hand is in range
    // Cartesian coordinate system for modeling 3D space
    if (proximityFlag)
        {
        temp = MyI2C_Reg.right;
        temp -= MyI2C_Regs.left;
        temp <<= XY_Resolution – Z_DIVSOR;
        temp /= MyI2C_Regs.zDir;
        MyI2C_Regs.xDir = temp;

temp = MyI2C_Regs.up;
        temp -= MyI2C_Regs.down;
        temp <<= XY_Resolution – Z_DIVSOR;
        temp /= MyI2C_Regs.zDir;
        MyI2C_Regs.yDir = temp;

MyI2C_Regs.zDir >>= 3;
        }
    else
        {
        MyI2C_Regs.xDir = 0;
        MyI2C_Regs.yDir = 0;
        MyI2C_Regs.zDir = 0;
        }
    M8C_EnableGInt;
    }
}
```

FIG. 20C

PROXIMITY BASED GESTURING DEVICES, SYSTEMS AND METHODS

CROSS-REFERENCE TO RELATED APPLICATIONS

This application is a continuation of U.S. patent application Ser. No. 13/734,590, filed Jan. 4, 2013, which is a continuation of U.S. patent application Ser. No. 12/767,690, filed Apr. 26, 2010, now U.S. Pat. No. 8,355,887, issued Jan. 15, 2013, which claims priority to U.S. Provisional Patent Application No. 61/172,376, filed Apr. 24, 2009, all of which are incorporated by reference herein in their entirety.

TECHNICAL FIELD

The present disclosure relates generally to sensors systems for detecting objects without physically contacting the objects, and more particularly to sensor systems that provide three dimensional position information on such a detected object.

BRIEF DESCRIPTION OF THE DRAWINGS

FIGS. 7A to 7D are a sequence of diagrams showing an object detection and position identification operation according to embodiments.

FIG. 9 is a block schematic diagram of an image sensing system according to an embodiment.

FIGS. 10A to 10C are diagrams illustrating an image sensing system according to a particular embodiment.

FIG. 12 is a block schematic diagram of a computing system according to an embodiment.

FIG. 13 is a block schematic diagram of an electrical or electro-mechanical system according to an embodiment.

FIGS. 14 to 17 are diagrams of various particular embodiments.

FIGS. 20A to 20C show code executable by a processing device according to one very particular embodiment.

DETAILED DESCRIPTION

Figure 1:
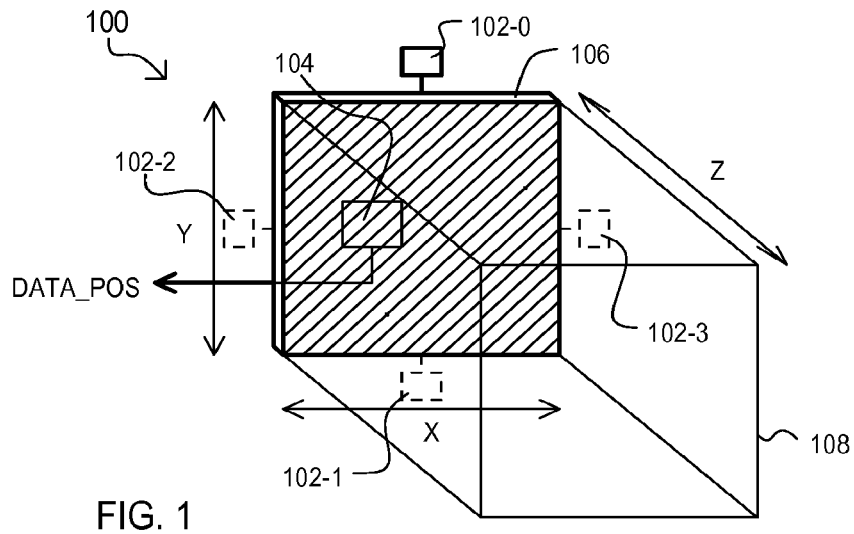
FIG. 1 is a block diagram of a device including sensors, a processing circuit, and a device surface, according to one embodiment.

Various embodiments will now be described that show devices and methods for detecting an object position without contacting the object. In some embodiments, multiple sensors may be generally arranged in a sensor plane, and derive two dimension position data (e.g., object position as projected onto the sensor plane) as well as third dimension position data (e.g., object position from the sensor plane). Alternate embodiments may generate three dimensional position data in response to image data from a single image sensor.

In the particular embodiments shown, like sections will be referred to by the same reference character but with the first digit(s) corresponding to the figure number.

Referring to FIG. 1, a device according to one embodiment is shown in a block diagram and designated by the general reference character 100. A device 100 may include one or more sensors (four shown as 102-0 to -3), a processing circuit 104, and a device surface 106.

Sensor(s) (102-0 to -3) may be positioned with respect to a device surface 106 to detect the presence of an object (not shown) within a detection space. A portion of a detection space 108 is shown by a box, however, it is understood that a detection space may extend further in all dimensions (shown in FIG. 1 as X, Y, Z). Sensor(s) (102-0 to -3) may operate alone (e.g., sense a capacitance, acquire an image), or may operate in conjunction with a stimulus (e.g., detect particular sound waves and/or light waves emitted from one or more stimulus emitters).

In embodiments that include more than one sensor, such multiple sensors may be substantially positioned in a same plane (e.g., the X-Y plane in FIG. 1, or a plane parallel to the X-Y plane).

A processing circuit 104 may receive sensor signals from sensor(s) (102-0 to -3), and convert them into three dimensional position data (DATA_POS). Such position data (DATA_POS) may be made available for another device (i.e., a host device). It is noted that while a detection space portion 108 is defined by X, Y, Z directions, position data need not be expressed as Cartesian coordinates. In some embodiments, position data (DATA_POS) may identify an absolute position of an object within a detection space. Further, as used herein position data or values may be relative values, reflecting changes in particular dimension, rather than an absolute position in space. For example, in some embodiments, consecutive Z values may reflect whether an object is approaching, moving away from, or maintaining substantially a constant distance from a device.

A processing circuit 104 may include circuits for processing sensor results to generate position information. Processing circuits 104 may include logic circuits that are substantially non-programmable, or may include one or more processors that may execute instructions stored in an instruction memory that may be reprogrammed (e.g., firmware).

In this way, a device may provide position information for an object in a detection space with one or more sensors attached to a device surface.

Figure 2:
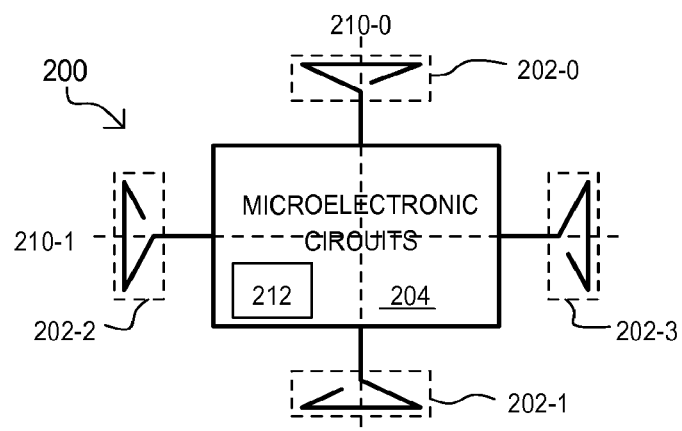
FIG. 2 is a block diagram of a device including sensors and microelectronic circuits, according to another embodiment.

Referring now to FIG. 2, a device according to another embodiment is shown in a block schematic diagram and designated by the general reference character 200. A device

200 may include four sensors 202-0 to -3 and microelectronic circuits 204 connected to receive sensor signals from the sensors (202-0-3).

Device 200 of FIG. 2 may be one very particular implementation of that shown in FIG. 1.

Sensors (202-0-3) may be arranged in substantially in a same plane. Further, two sensors (202-0 and -1) may be aligned with one another along a first axis 210-0, while two other sensors (202-2 and -3) may be aligned with one another along a second axis 210-1. Sensors (202-0-3) provide signals that may vary according to the presence of one or more objects, and changes in positions of such object(s).

A microelectronic circuit 204 may generate position values from signals received from sensors (202-0-3). In a particular embodiment, circuit 204 may include arithmetic/logic circuits 212 that generate first and second position values from signals received from less than all sensors, and a third position value with signals for all sensors. In a very particular embodiment, axes 210-0/1 may be substantially orthogonal to one another. Further, a first position value (e.g., X coordinate) may be generated from signals of two sensors (202-2/3), a second position value (e.g., Y coordinate) may be generated from signals of two other sensors (202-0/1), and a third position value (e.g., Z coordinate) may be generated from signals of all sensors (202-0 to -3).

In this way, a device may generate position values to identify a location of an object in a detection space, with some position values generated from signals of less than all sensors, and one or more position values generated from signals of all the sensors.

Figure 3:
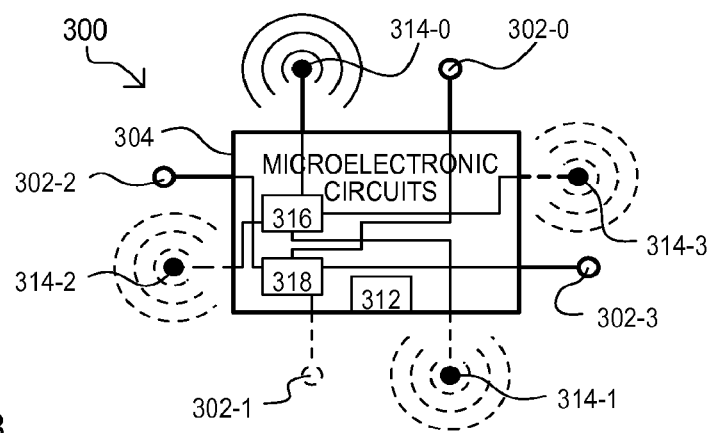
FIG. 3 is a block diagram of a device including sensors, stimulus emitters, and microelectronic circuits, according to another embodiment.

Referring now to FIG. 3, a device according to another embodiment is shown in a block schematic diagram and designated by the general reference character 300. A device 300 may include three or more sensors 302-0 to -2, one or more stimulus emitters 314-0-3, and microelectronic circuits 304.

Device 300 of FIG. 3 may be one very particular implementation of that shown in FIG. 1.

Stimulus emitters (314-0-3) may emit signals that interact with an object(s) (if present) and are detected by sensors (302-0-3). Stimulus emitters (314-0-3) may take various forms. In one embodiment, a stimulus emitter may be a sonic emitter that may emit sound signals, including acoustic and/or ultrasonic signals. Corresponding sensors (302-0-3) may be sonic or ultrasonic transducers. Stimulus emitters (314-0-3) may also be light emitters that emit light signals in visible and/or non-visible spectra. In very particular embodiments, such emitters may include light emitting diodes (LEDs), or laser light sources. Corresponding sensors may include photodiodes, or image sensor structures, including but not limited to those having complementary metal oxide semiconductor (CMOS) type and/or charge coupled device (CCD) type imaging cells.

Stimulus emitters (314-0-3) may emit a same type of signal, or may emit different types of signals. In one embodiment, different emitters (314-0-3) may emit signals having different frequencies and/or different types of modulation. Correspondingly, sensors (302-0-3) may differ from one another, each generating its own detection signals in response to only a particular emitted stimulus signal (or signals).

A microelectronic circuit 304 may generate position values from signals received from sensors (302-0-3) and control operations of stimulus emitters (314-0-3). In a particular embodiment, microelectronic circuit 304 may include stimulus timing control 316 and a sensor timing control 318. Such timing controls (316 and 318) may work in conjunction with one another to coordinate the activation of particular stimulus emitters in conjunction with particular sensors. Arithmetic/logic circuits 312 may generate first, second and third position values from signals received from sensors (302-0-3)

In this way, a device may generate stimulus signals that are detected by sensors to identify a location of an object in a detection space.

Figure 4:
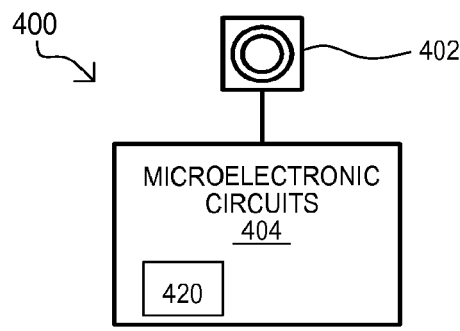
FIG. 4 is a block diagram of a device including an image sensor and microelectronic circuits, according to a further embodiment.

Referring now to FIG. 4, a device according to a further embodiment is shown in a block schematic diagram and designated by the general reference character 400. A device 400 may include an imaging sensor 402 and microelectronic circuits 404.

Device 400 may be one very particular implementation of that shown in FIG. 1.

Unlike the embodiments of FIGS. 2 and 3, a device 400 may have a single sensor 402, which may be an imaging sensor 402. Imaging sensor 402 may acquire an image of a detection space adjacent to the device. Such image data may be provided to microelectronic circuits 404.

A microelectronic circuit 404 may generate position values from image data received from imaging sensor 402. In a particular embodiment, microelectronic circuit 404 may include image processing circuits 420. Image processing circuits 420 may operate on received image data to detect an object, and changes in the position of such an object. In a particular embodiment, image processing circuits 420 may generate first and second position values from image data, and vary a third position value in response to image data.

In this way, a device may detect a position of an object (or absence of an object) with a single attached image sensor.

Figure 5:
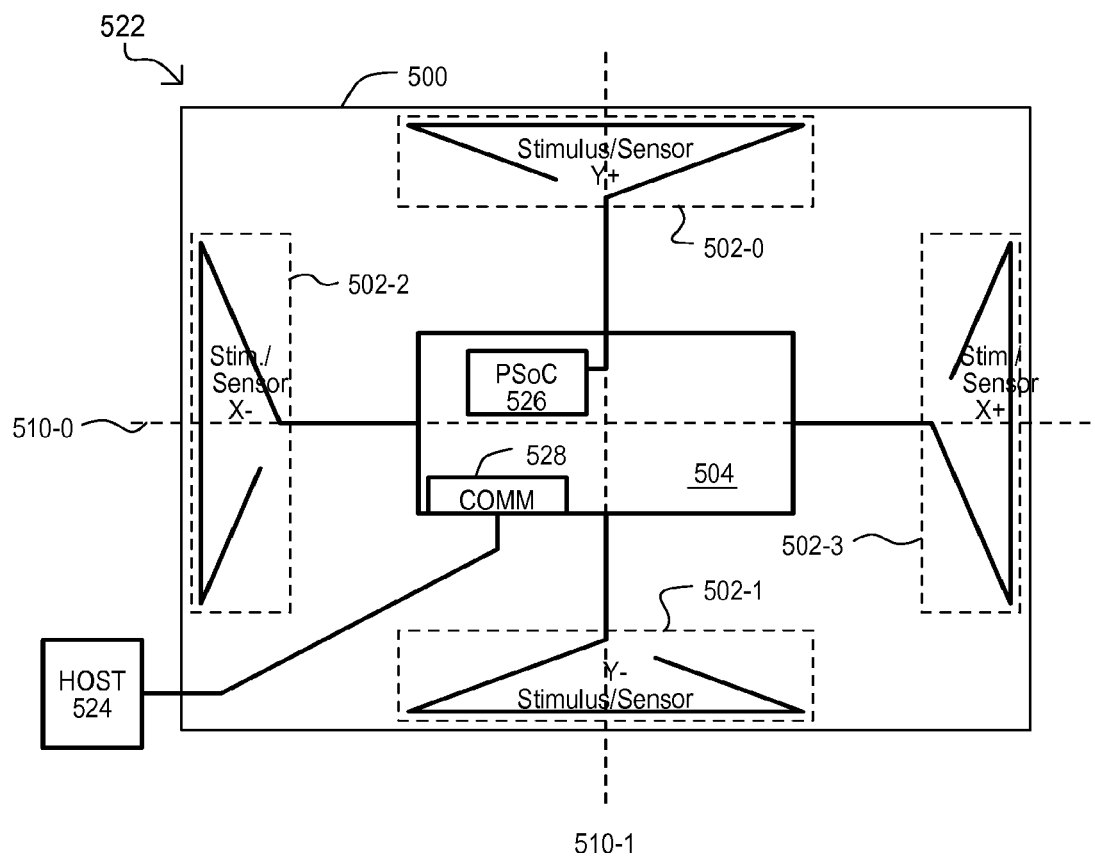
FIG. 5 is a block schematic diagram of a capacitance sensing system according to another embodiment.

Referring now to FIG. 5, a system according to an embodiment is shown in a block schematic diagram and designated by the general reference character 522. A system may include a detect device 500 and a host device 524.

A detect device 500 may be one very particular implementation of that shown in FIG. 2.

A device 500 may be a capacitance sensing device having capacitance sensors 502-0 to -3 and processing circuits 504. A device 500 may detect the presence and position of an object, such as a hand, according to changes in capacitance at sensors (502-0-3). Sensors (502-0-3) may be formed from any suitable conductive material. As but two examples, in one embodiment one or more sensors may be formed from a metal (e.g., copper), or metal alloy, while in another embodiment, sensors may be formed from a transparent conductive material, such as indium tin oxide (ITO). However, alternate embodiments may include any other suitable conductive materials.

As in the case of FIG. 2, sensors (502-0-3) may be aligned with one another along two axes 510-0/1, which in the embodiment shown, may be perpendicular to one another. Even more particularly, axes 510-0/1 may intersect at a central position of a detection space. Sensor 502-0 may generate a Y+ value, sensor 502-1 may generate a Y− value, sensor 502-2 may generate an X+ value, and sensor 502-3 may generate an X− value. As will be described in more detail below, such values may be utilized to determine position information of an object within a detection space.

Processing circuits 504 may include a programmable system integrated circuit (IC) 526 and optionally, a communication circuit 528. A programmable system IC 526 may include both analog circuits for sampling and converting data from sensors (502-0-3) into digital values, as well as digital circuits for calculating position information from such digital values. In one particular embodiment, a programmable system IC 526 may include a PSoC® integrated circuit device, such as a CY8C24×94 programmable embedded system-on-chip, manufactured by Cypress Semiconductor Corporation, of San Jose, Calif., U.S.A.

A communication circuit 528 may be provided in order to convert communications from a protocol used by programmable system IC 526 to one used by host device 524. In the embodiment of FIG. 5, a communication circuit 528 may transmit position information as position values X, Y, Z to a host 524. In a very particular embodiment, a communication circuit 528 may be a bridge IC for communicating between the Universal Serial Bus (USB) protocol and the I2C protocol. Other embodiments may use any other suitable protocol.

A host device 524 may utilize position values received from device 500 as input control data to enable a user to control the operation of the host device. Particular examples of hosts that may be included in embodiments will be described in more detail below.

In this way, a device may use capacitance sensing to detect an object without contacting such an object with an IC having analog and digital circuits for generating position values from sensed capacitance values.

Figure 6:
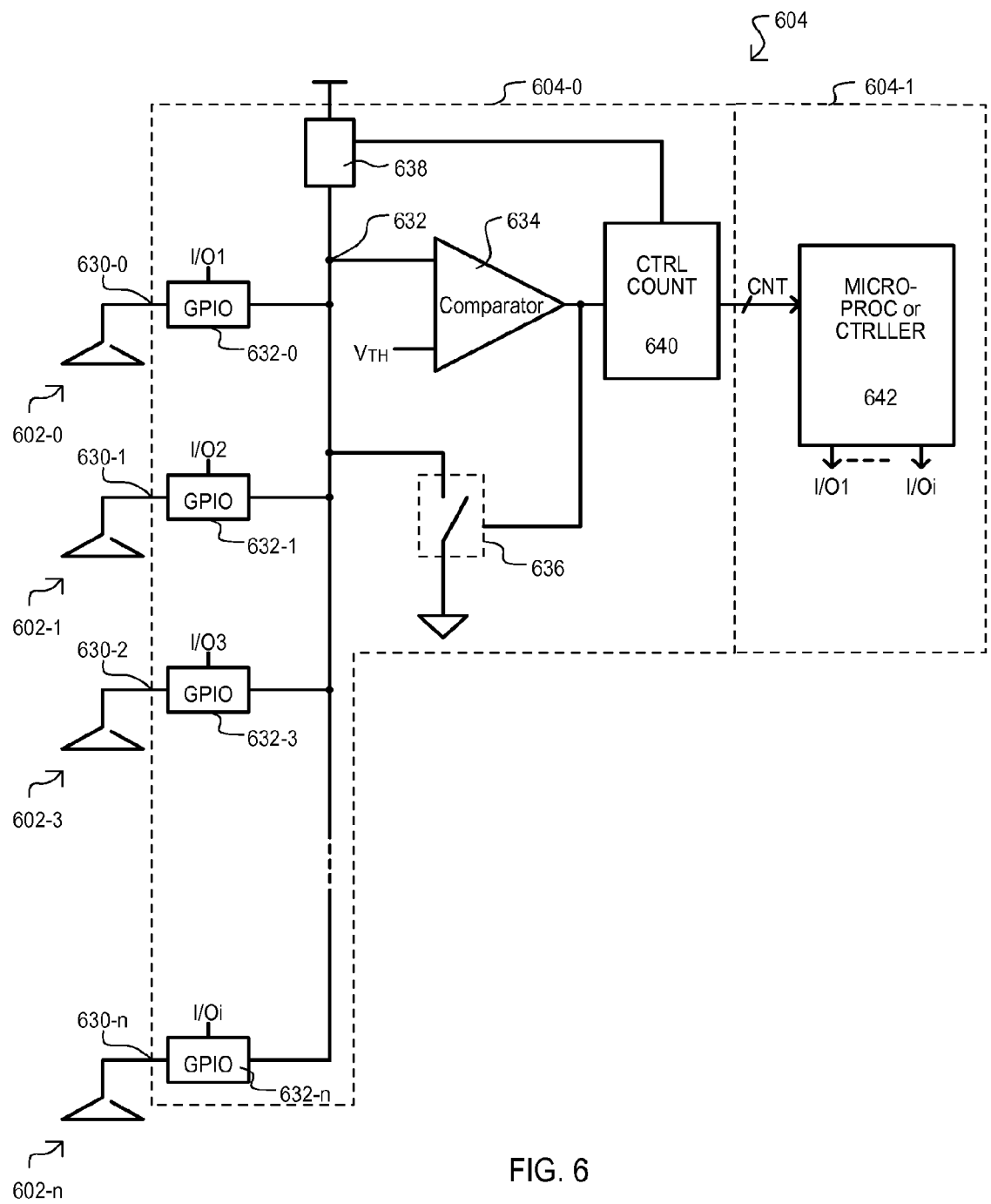
FIG. 6 is one example of processing circuits that may be included in an embodiment like that of FIG. 5.

Referring now to FIG. 6, one example of processing circuits 604 that may be included in embodiments is shown in a schematic diagram. Processing circuits 604 may be formed in a same IC, and may include an analog portion 604-0 and a digital portion 604-1. An analog portion 604-0 may connect to a number of sensors 602-0 to -n, at input/outputs (I/Os) 630-0 to -n. I/Os (630-0 to -n) may be connected to a same sample node 633 by corresponding switches 632-0 to -n. Such an arrangement may enable sensors (602-0 to -n) to be sequentially connected to sample node 633 for a capacitance measurement. Sequential sampling may provide for lower power consumption and fewer processing circuits than approaches that process signals in parallel.

An analog portion 604-0 may also include a comparator 634, a discharge switch 636, a charge switch 638, and a control and count circuit 640. In combination, these circuit elements may generate a count value representative of a sensor value (e.g., capacitance) sensed at sample node 633. Such a sensing operation may be according to integration techniques, successive approximation techniques, sigma-delta conversion, or any other suitable technique for measuring a signal at sample node 633. Thus, an analog portion 604-0 may include analog to digital conversion circuits that generate a digital value (counts) from an analog value (raw value detected at sample node 633).

Referring still to FIG. 6, a digital portion 604-1 may include a microcontroller 642 that may execute predetermined operations on received count values to determine if one or more objects have been detected, and the position of such objects. Further, based on position information acquired at different times, a microcontroller 642 may generate velocity and/or acceleration values for an object.

Having described various devices and systems, operations for determining a position of an object in a detection space will now be described in FIGS. 7A to 7D. FIGS. 7A to 7D show a representation of a device 700 having sensors 702-0 to -3 arranged in a manner like that of FIG. 2, and may be one particular implementation of the device of FIG. 2. Sensor values X+, X−, Y+, Y− may be generated from sensors 702-3, -2, -0, -1, respectively. Sensor values X−, X+, Y−, Y+ generated for an object position are shown in corresponding graphs. FIGS. 7A to 7D show a portion of a detection space 708 arbitrarily divided by two grids 744-0/1.

It is noted that in the particular embodiments of FIGS. 7A to 7D, closer proximity to a sensor (702-0-3) results in a greater sensor values. Further, a "Z" value may be larger the closer an object is to the sensors (702-0-3). However, alternate embodiments may have a different response (e.g., value decreases as proximity increases). Sensor values −X/+X/−Y/+Y may be generated according to any of the techniques described herein and equivalents, including capacitance measurements, sonic measurements, light measurements, or other signal measurements (difference between emitted stimulus signal and sensed stimulus signal, etc.).

Referring now to FIG. 7A, an object 746 may be substantially centered when projected onto a sensor plane containing sensors (702-0-3), and at a relatively far distance, signified by object 746 being beyond grids 744-0 and -1. As shown in the graph, sensor values X−, X+, Y− and Y+ may all be relatively small. In response to such sensor values, processing circuits may generate position values (X, Y, Z)=(0, 0, small).

In particular embodiments, the presence of an object 746 may be determined by one or more position values being outside a threshold value.

Referring now to FIG. 7B, an object 746 may again be substantially centered when projected onto a sensor plane containing sensors (702-0-3). However, unlike FIG. 7A, object 746 may be close to such a plane, signified by object 746 being in front of grids 744-0 and -1. As shown in the graph, sensor values X−, X+, Y− and Y+ may all be relatively large. In response to such sensor values, processing circuits may generate position values (X, Y, Z)=(0, 0, big).

Referring now to FIG. 7C, an object 746 may be more toward a sensor 702-3 when projected onto a sensor plane, but midway from such sensors in the Z direction, signified by object 746 being between grids 744-0 and 744-1. As shown in the graph, sensor values X− may be relatively small, sensor values Y− and Y+ may have moderate values, and sensor value X+ may be relatively large. In response to such sensor values, processing circuits may generate position values (X, Y, Z)=(Big+, 0, medium).

Figure 7D:
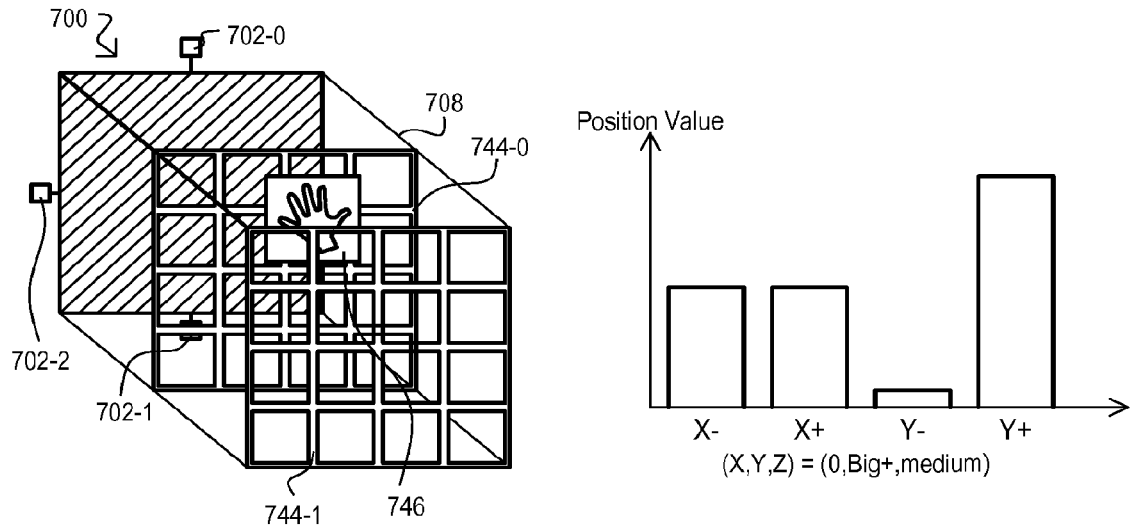

Referring now to FIG. 7D, an object 746 may be more toward a sensor 702-0 when projected onto a sensor plane, but midway from such sensors, signified by object 746 being between grids 744-0 and 744-1. As shown in the graph, sensor values X− and X+ may have moderate values, sensor value Y− may be relatively small, but sensor value Y+ may be relatively large. In response to such sensor values, processing circuits may generate position values (X, Y, Z)=(0, Big+, medium).

Referring still to FIGS. 7A to 7D, position values (i.e., X, Y, Z) may be calculated from sensor values (i.e., X−, X+, Y−, Y+) according to any suitable technique. In one very particular embodiment, in which a detection space may have a substantially same resolution in all dimensions, X and Y positions may be generated with two point centroid equations:

$$X \text{ direction}=K*(-1*X-+X+)/(X-+X+)$$

$$Y \text{ direction}=K*(-1*Y-+Y+)/(Y-+Y+)$$

where K/2 is a desired resolution in the X and Y directions.

A Z position value may be generated by the equation:

$$Z \text{ direction}=L*(X-+X++Y-+Y+)$$

where L is a constant that normalizes the Z direction to a resolution similar to that of the X and Y directions.

In this way, a device may utilize centroid calculations to generate three dimensional coordinate values of an object in a detection space.

As emphasized above, alternate embodiments may use different calculations to derive three dimensional position values for an object based on multiple sensor values. One particular alternate embodiment is shown in FIG. 8.

Figure 8:
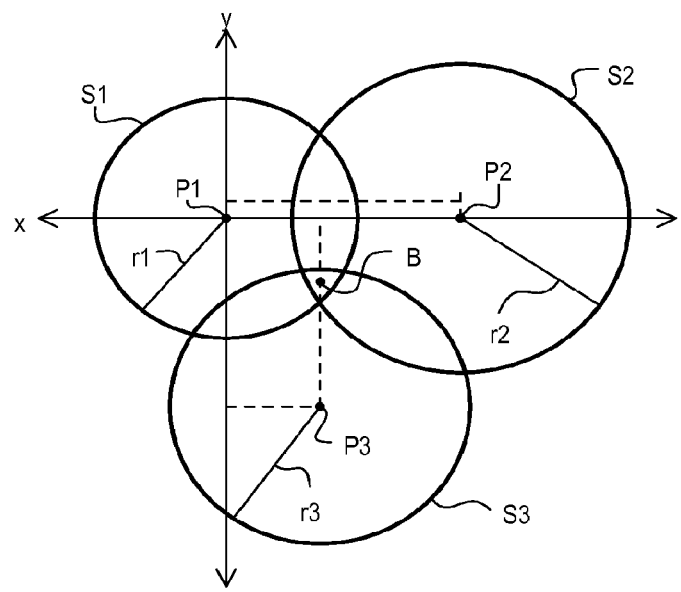
FIG. 8 is a diagram showing an object detection and position identification operation that may be included in embodiments.

Referring to FIG. 8, an example of a trilateration approach to determining position is shown in a plan diagram. Sensors positions may correspond to positions P1, P2 and P3, in substantially a same plane (e.g., X-Y plane, with Z=0). A trilateration embodiment may be conceptualized as assigning spheres (shown as S1, S2, S3) having centers at each point (P1, P2 and P3), and radii values (r1, r2, r3) generated from sensor readings. In one particular approach, point P1 may be assumed to reside at an origin in an X, Y, Z coordinate system, and point P2 may reside on the X-axis of such a coordinate system.

Trilateration calculations may be made by taking the formulas for each sphere, and setting them equal to one another, thus solving for a point at which all spheres intersect. In the embodiment shown in FIG. 8, point B may be a solution (it is understood that point B extends above the Z plane, having a positive Z value). Coordinates of point B ($X_B$, $Y_B$, $Z_B$) may be translated into another coordinate system as desired to map the intersection point to another space, as needed.

As in the case of FIGS. 7A to 7D, in particular embodiments, the presence of an object may be determined by one or more position values being outside a threshold value.

While FIG. 8 shows trilateration with three points, other embodiments may utilize trilateration with different sets of points, or multilateration with more than three points.

In this way, a device may utilize trilateration to generate three dimensional coordinate values of an object in a detection space.

Referring now to FIG. 9, a system according to a further embodiment is shown in a block schematic diagram and designated by the general reference character 922. A system may include a detect device 900 and a host device 924.

A detect device 900 may be one very particular implementation of that shown in FIG. 4.

A device 900 may be an image capture and processing device having an image sensor 902 and processing circuits 904. A device 900 may detect the presence and position of an object, such as a hand, according to changes in acquired image data. Image sensors 902 may be an image sensing device suitable to provide data that may enable objects to be distinguished from an image background. As but a few examples, image sensor embodiments may include CMOS image sensors, CCD image sensors, and/or video cameras based on those or other technologies.

In particular embodiments, an image sensor 902 may be attached to device 900 to acquire image data of a detection space adjacent to the device. Unlike other embodiments above, an image sensor 902 may be a sole sensor used by device 900 to generate position data.

In FIG. 9, processing circuits 904 may include a processor 948, an operational memory 950, and an instruction memory 952. In one embodiment, processing circuits 904 may be formed in a single integrated circuit device (i.e., all in a same substrate, or multiple ICs in a same integrated circuit package). An operational memory 950 may store image data acquired by image sensor 902. Such image data may include an entire field of view for image sensor 902, or alternatively, only a portion of such a field (e.g., selected lines, quadrants).

A processor 948 may execute predetermined instructions stored within instruction memory 952 to derive position data from image data stored in operational memory 950.

An instruction memory 952 may store routines for execution by processor 948. In the particular embodiment shown, instruction memory 952 may store calibration instructions (Calibration), detection instructions (Detection), and position determination instructions (Position). Calibration instructions may establish a background image state to indicate the absence of an object in a detection space. Detection instructions may determine when one or more objects are present within a detection space. Such instruction may include image recognition routines for detecting particular objects (e.g., human hands). Position determination instructions may generate position data of a detected object within the detection space. Such instructions may include a user input to set an initial object position of a detected object.

As in the case of FIG. 5, communication circuit 928 may provide communications between processing circuits 904 and a host device 924. Similarly, a host device 924 may utilize position values received from device 900 as input control data to enable a user to control the operation of the host device.

In this way, a device may use image capture data to detect an object without contacting such an object with circuits that generate position values from acquired image data.

Referring now to FIGS. 10A to 10C, a system according to another embodiment is shown in a series of views and designated by the general reference character 1022. A system 1022 may be one very particular implementation of that shown in FIG. 9. FIG. 10A is a side view of a system 1022. FIG. 10B is a top view of system 1022. FIG. 10C is a representation of image data 1048 acquired by an image sensor of device 1022.

Referring to FIGS. 10A and 10B, a system 1022 may be a host computing device 1024 having an integrated display. A non-contact object position sensing device 1000 may include an image sensor 1002 and a processing circuit 1004. Image sensor 1002 may acquire image data from a field of view 1050. In the embodiment shown, an object position may be identified by X, Y and Z axes. However, other embodiments may generate position data in other forms.

Referring to FIG. 10C, image data may be background image data corresponding to an absence of an object.

Having described a system in FIGS. 10A to 10C, methods for determining a position of an object in a detection space with such a system will now be described in FIGS. 11A to 11D.

Figure 11A:
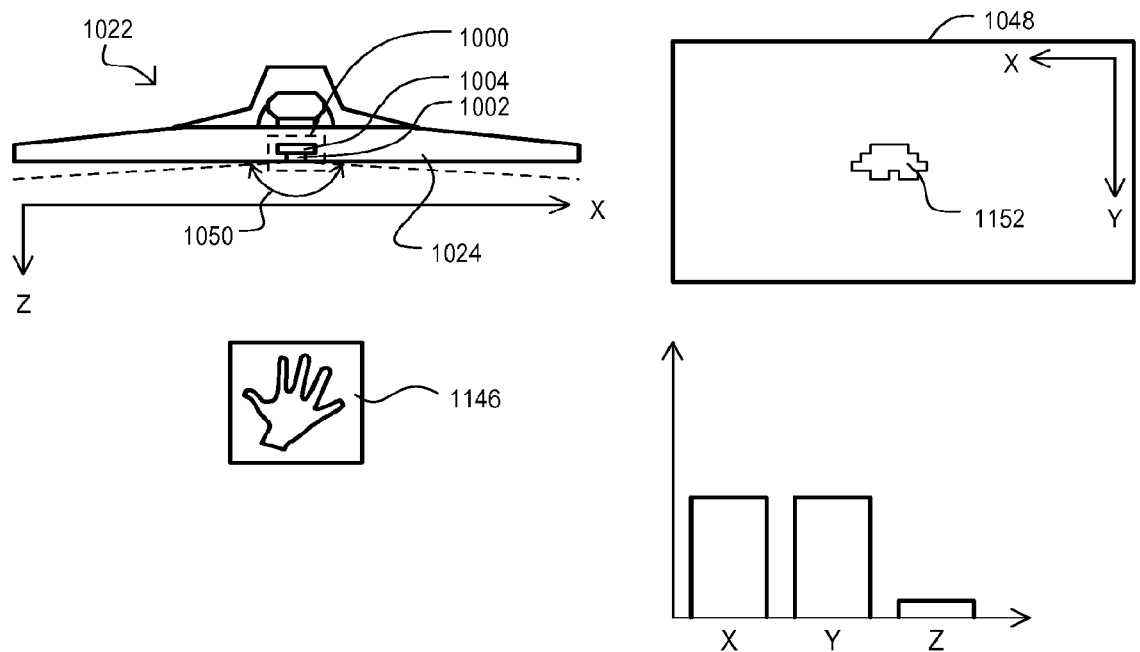
FIGS. 11A to 11D are a sequence of diagrams showing an object detection and position identification operation according to other embodiments.

Referring now to FIG. 11A, an object 1146 may be substantially centered with respect to X and Y axes, and at a relatively far distance with respect to the Z axis. Image data 1048 may distinguish object data 1152 from background data. In response to such object and background data, processing circuits 1004 may generate position values X, Y and Z. As shown in a graph, position values X and Y may be moderate, while value Z may be relatively small.

Figure 11B:
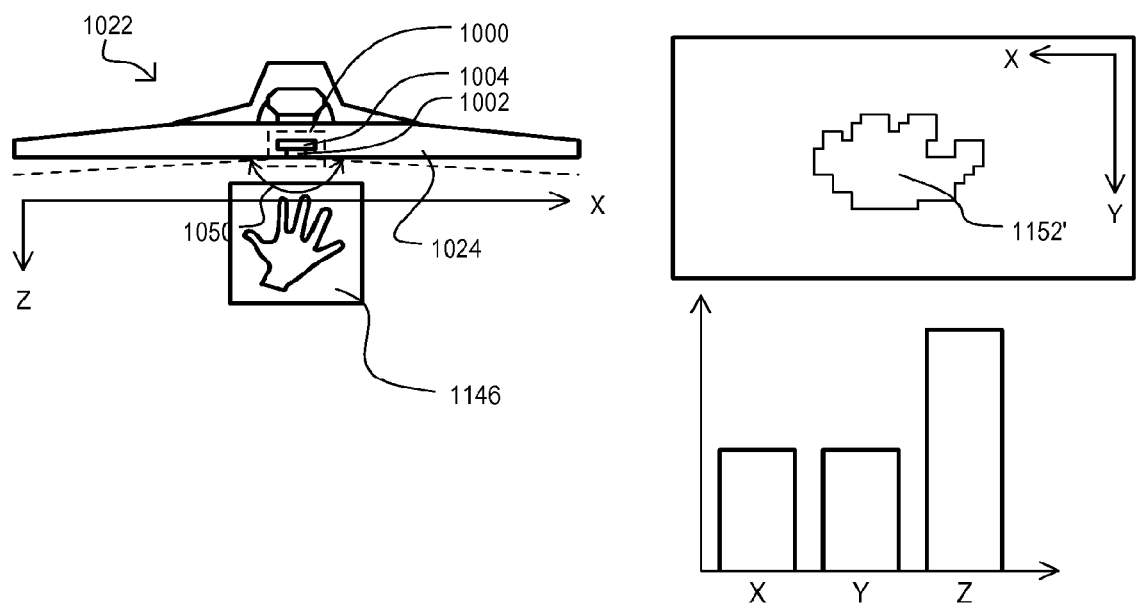

Referring now to FIG. 11B, an object 1146 may remain substantially centered with respect to X and Y axes, but move closer to host device 1024 with respect to the Z axis. Image data 1048 may again distinguish new object data 1152' from background data. In response to such object and background data, processing circuits 1004 may generate new position values X, Y and Z. As shown in a graph, position values X and Y may be moderate, while value Z may be relatively large.

Figure 11C:
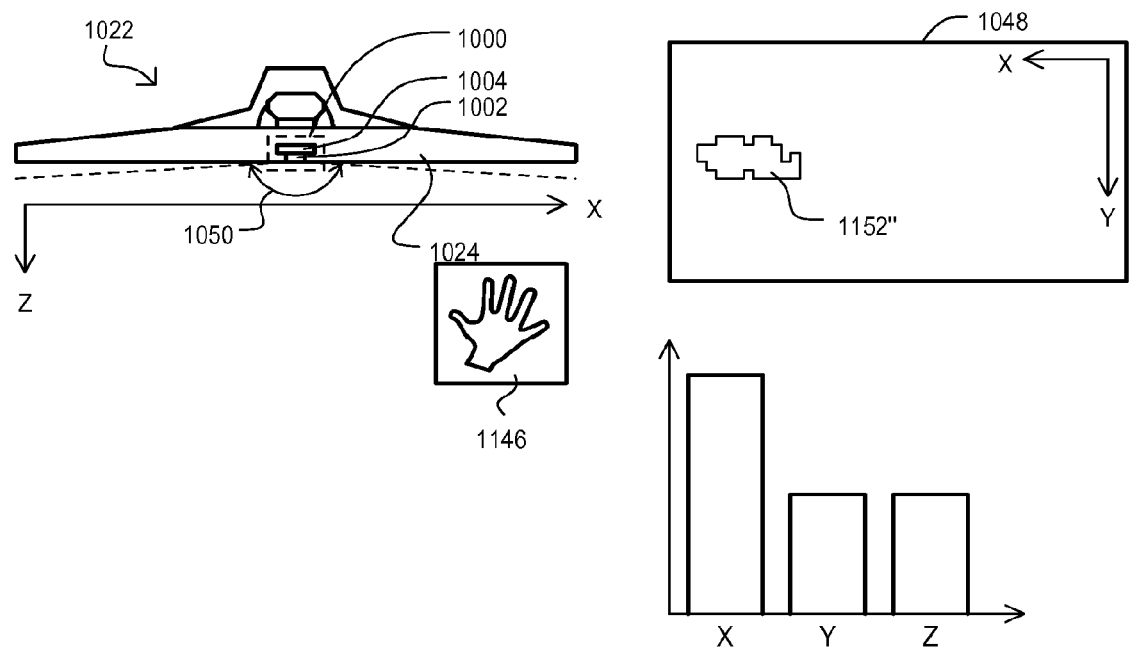

Referring now to FIG. 11C, an object 1146 may remain substantially centered with respect to the Y axis, but move to one side with respect to the X axis, and move back from host device 1024 with respect to the Z axis. Image data 1048 may again distinguish object data 1152" from background data. In response to such object and background data, processing circuits 1004 may generate further position values X, Y and Z. As shown in a graph, position values Y and Z may be moderate, while value X may be relatively large.

Figure 11D:
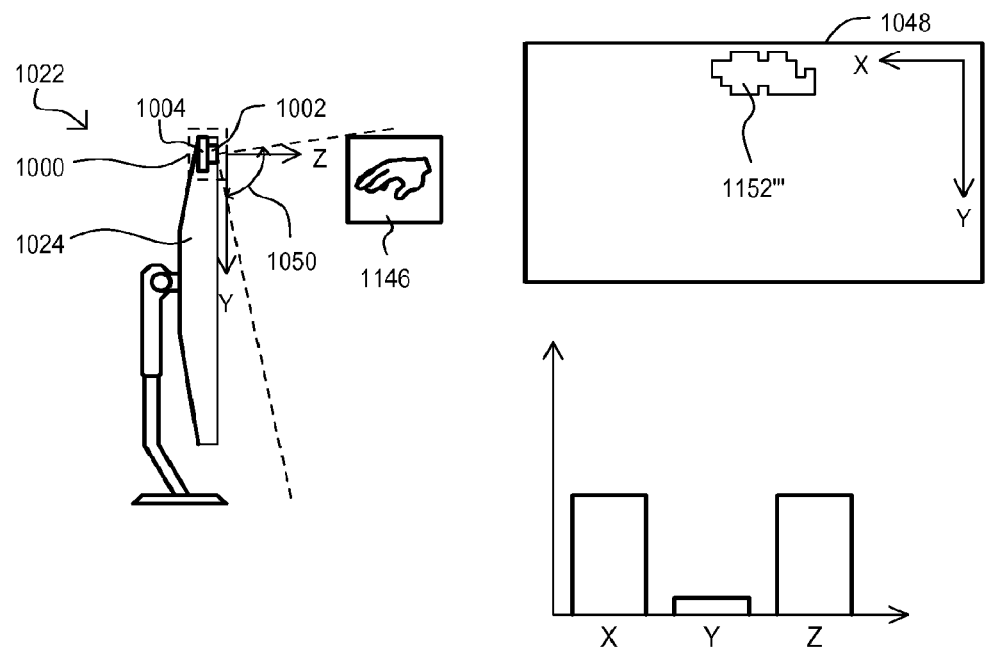

Referring now to FIG. 11D, an object 1146 may move to a center with respect to the X axis, but may move higher with respect to the Y-axis, while maintaining substantially the same distance with respect to the Z axis. Revised image data 1048 may be processed to distinguish object data 1152''' from background data. In response to such object and background data, processing circuits 1004 may generate moderate X and Z position values, and a relatively small Y value.

In this way, a device may use image capture data to generate three dimensional position data for an object in a detection space.

As shown in embodiments above, systems according to the invention may include a sensing device that may provide position information to a host device. Particular system embodiments will now be described. It is stressed that such embodiments are intended to be illustrative, and not exhaustive.

Referring to FIG. 12 a system according to an embodiment is shown in a block schematic diagram and designated by the general reference character 1222. A system 1222 may be a computing device, including but not limited to desktop computing devices as well as portable computing devices, including handheld computing devices. A system 1222 may include a detection device 1200 and a computing section 1254.

A detection device 1200 may correspond to any of the devices described herein, or equivalents, and may generate three dimensional position information for an object without physically contacting the object.

A computing section 1254 may be conceptualized as having a number of operational layers, including user interface 1256 and a main program layer 1258. User interface software 1256 may accept position data, and optionally, translate such data into another form. In some embodiments, user interface software 1256 may generate interrupts to notify when input events occur based on the detection and/or movement of a detected option. Alternatively, position information may be periodically polled.

A main programming layer 1258 may include an operation system (OS) as one or more application programs (APP) for executing functions in response to inputs from detection device 1200. A computing section 1254 may physically be implemented by one or more processors that execute predetermined instructions stored in a memory.

It is noted that in an embodiment like that of FIG. 12, a computing section 1254 may receive input values from other devices and/or interfaces in conjunction with those from detection device 1200.

Referring to FIG. 13 a system according to another embodiment is shown in a block schematic diagram and designated by the general reference character 1322. A system 1322 may be an electrical or electromechanical device. As but a few examples, a system may include home electronics products, home automation products, home appliances (e.g., "white" goods), as well as automotive, aeronautic and/or nautical devices. A system 1322 may include a detection device 1300 and an electrical and/or electromechanical section 1354.

A detection device 1300 may correspond to any of the devices described herein, or equivalents, that generate three dimensional position information for an object without physically contacting the object.

An electrical and/or electromechanical section 1354 may include electrical or electromechanical devices that may be controlled according to inputs from detection device 1300.

Referring to FIG. 14, a very particular embodiment is shown in a front plan view and designated by the reference character 1422. A system 1422 may be a display device, and may be one implementation of that shown in FIG. 12 or 13.

A system host 1424 may include a display device for presenting an image, including viewing images and/or a graphical user interface. Such a system 1422 may include, without limitations, stand alone computer displays, computers with integrated displays, televisions, or electronic picture frames, to name just a few.

In the particular embodiment shown, sensors 1402-0 to -3 may be disposed on a periphery of a device surface (in this case the display surface). This is in contrast to embodiments that may have sensors disposed over a majority of a viewing area. Sensors (1402-0-3) may take the form of any of those shown herein, and equivalents. Sensors (1402-0-3) may be connected to processing circuits (not shown), and may generate three dimensional position information for detected objects according to the embodiments herein, and equivalents.

Referring to FIG. 15, another particular embodiment is shown in a perspective view and designated by the reference character 1522. A system 1522 may be a portable device, and may be one implementation of that shown in FIG. 12.

A system host 1524 may include a portable electronic device. Such a system 1522 may include, without limitations, a cellular phone, personal digital assistant, personal media player, person gaming device, or tablet computer, to name but a few. As in the case of FIG. 14, sensors 1502-0 to -3 may be disposed on a periphery of system 1522 and connected to processing circuits (not shown). Sensors (1502-0-3) may take the form of any of those shown herein, and equivalents.

In one embodiment, sensors (1502-0-3) may surround a user touch interface 1556. Sensors (1502-0-3) may provide sensor values that allow control of system 1522 in conjunction with, or separate from, user touch interface 1556. In a very particular embodiment, a system 1522 may include a capacitive sense touchscreen. Capacitive sensing of the touchscreen may be used to detect a proximity of an object without contacting the object, as described herein. Such a touchscreen, may or may not also serve as a user input by users contacting the surface of the touchscreen.

Referring to FIG. 16, a further particular embodiment is shown in a top plan view and designated by the reference character 1622. A system 1622 may be a human interface device (HID) for inputting control information to a computing device, and may be one implementation of that shown in FIG. 12.

In the particular embodiment shown, a system host 1624 may be a keyboard having sensors 1602-0 to -3 disposed on a periphery of a device surface (in this case the keyboard surface). Sensors (1602-0-3) may take the form of any of those shown herein, and equivalents and may be connected to processing circuits. Sensors (1602-0-3) may provide position values on a keyboard output 1658. Such values may operate in conjunction with, or separate from, keystroke data generated by a keyboard.

In alternate embodiments, sensors may be formed within a system host utilizing existing structures, or modifying existing structures to function as sensors. Referring to FIG. 16 again, in one very particular embodiment, existing conductive traces within a keyboard structure may serve as capacitance sensors, in a capacitive sensing embodiment.

Referring to FIG. 17, yet another particular embodiment is shown in a front plan view and designated by the reference character 1722. A system 1722 may be a household appliance.

In the particular embodiment shown, a system host 1724 may include a user interface 1756 for controlling the system 1722. Sensors 1702-0 to -3 may be formed with a user interface 1756. Sensors (1702-0-3) may take the form of any of those shown herein, and equivalents, and may be connected to processing circuits.

It is noted that while FIGS. 14 to 17 show four sensors arranged at the peripheries of a system surface, alternate embodiments may include fewer sensors, or greater numbers of sensors disposed at various locations with respect to a system surface. That is, FIGS. 14-17 are but examples of implementations.

While embodiments may include sense devices that may sense objects without physical contact, as well as systems including such device, other embodiments may include methods of sensing as described in above embodiments. Additional method embodiments will now be described below.

Figure 18:
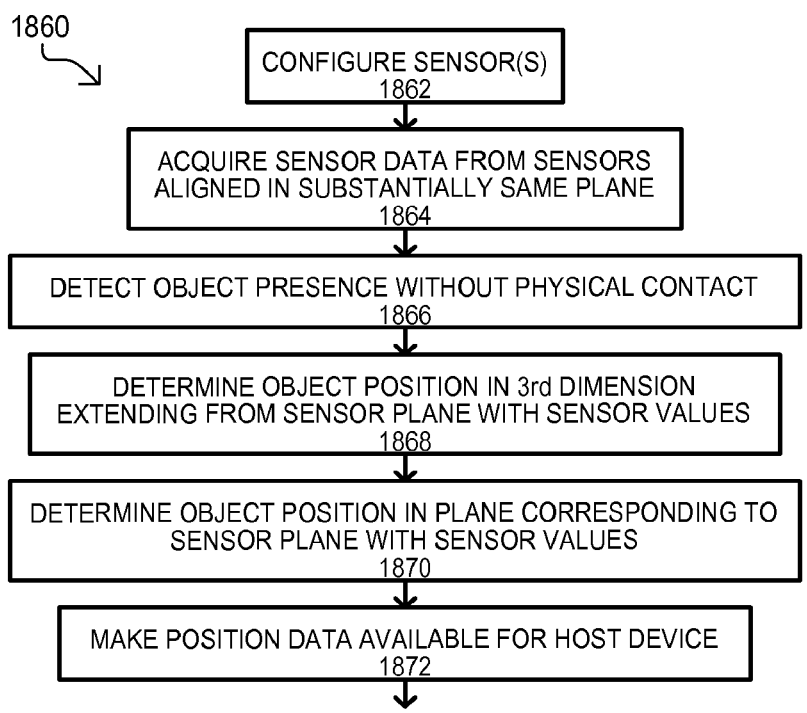
FIG. 18 is a flow diagram of a method according to an embodiment.

Referring to FIG. 18, a method according to a first embodiment is shown in a flow diagram and designated by the general reference character 1860. A method 1860 may include configuring sensors (box 1862). Such an action may include establishing configuration values corresponding to a particular sensor arrangement. As but a few examples, this may include configuring for type of sensor (e.g., capacitive, optical, acoustic, etc.), number and position of sensors, resolution of a detection space, threshold limits, filtering values, etc.

Sensor data may be then be acquired for sensors aligned in substantially the same plane (box 1864). Such an action may include measuring a sensor feature and/or activating one or more stimuli and measuring sensor responses to such stimuli.

An object presence may then be detected without physically contacting the object (box 1866). Such an action may include determining if one or more sensor values exceed a threshold value, thereby indicating the presence of an object within a detection space.

In the embodiment shown, a method 1860 also includes determining an object position in a third dimension extending from the sensor plane with sensor values (box 1868). Such an action may include utilizing all or a portion of the sensor values to derive a third dimension position value.

Referring still to FIG. 18, a method 1860 also includes determining an object position in a plane corresponding to the sensor plane with the sensor values (box 1870). Such an action may include utilizing all or a portion of the sensor values to derive a position of an object as projected onto a sensor plane.

A method 1860 may make three dimensional position data available for a host device (box 1872). Such an action may include storing position information for access by a host device, or transferring position information to storage locations within a host device.

Figure 19:
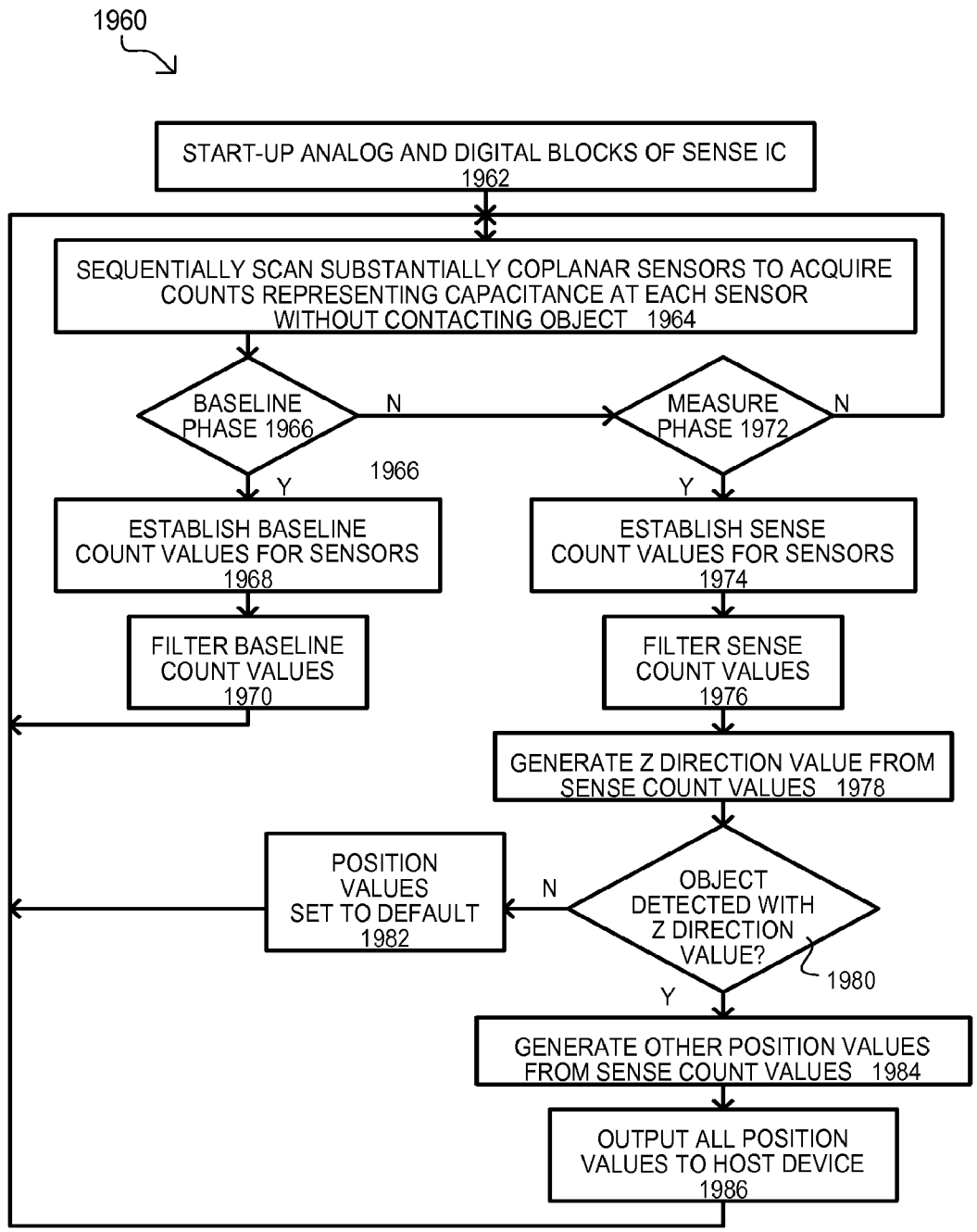
FIG. 19 is a flow diagram of a method according to a further embodiment.

Referring now to FIG. 19, a method according to another embodiment is shown in a flow diagram 1960. A method 1960 may include starting up analog and digital blocks of a sense IC (box 1962). Such an action may include configuring analog circuit blocks to sense values from sensors, and digital circuit blocks to execute evaluation operations on data generated from sensor values.

In the embodiment shown, a method 1960 may include sequentially scanning substantially coplanar sensors to acquire counts representing a capacitance at each sensor without contacting an object (box 1964). In a particular embodiment, such an action may include sequentially connecting each sensor to a common sensing node to acquire an analog value corresponding to a capacitance, and then converting such a value into a digital value. Conversion techniques may include, but are not limited to integration with analog-to-digital conversion, successive approximation, or sigma-delta conversion, to name but a few.

If in a baseline phase (Y from box 1966), baseline count values may be acquired for each sensor (box 1968). Baseline count values may establish a "background" or other condition representing a detection space in the absence of an object. Such baseline values may be filtered (box 1970). Such filtering may eliminate transient events that may adversely skew a background condition. Filtering may be a digital filtering operation performed by digital blocks of a sense IC.

If not in a baseline phase (N from box 1966) but in a measure phase (Y from box 1972), a method may establish count values for sensors (box 1974). Such an action may include performing arithmetic and/or logic operations on raw sensors count value with digital blocks of a sense IC. As in the case of baseline sensor values, acquired sensor values may be filtered (box 1976).

A method 1960 may generate a Z direction value from sense count values (box 1978). Such an action may include calculating a Z position value with digital circuit blocks from sense count values. In a very particular embodiment, such an action may include summing count values and then dividing (logically shifting for a divisor that is a power of 2) such a value, as described above in conjunction with FIGS. 7A to 7D. A method 1960 may then check for the presence of an object based on established count values (box 1980). Such an action may include checking a Z position value with a predetermined threshold.

If an object is not detected (N from box 1980), position values may be set to some predetermined values (e.g., X=Y=Z=0).

If an object is detected (Y from box 1982), additional position values may be generated (e.g., X and Y values) (box 1984). Such an action may include calculating X and Y position values with digital circuit blocks from sense count values. In a very particular embodiment, such an action may include calculating such values using centroid equations as described above in conjunction with FIGS. 7A to 7D. All position values may then be output to a host device (box 1986). It is understood that all position values may provide a point in a three dimensional detection space.

Referring now to FIGS. 20A to 20C, code executable by a Cypress Semiconductor Corporation PSoC device is shown in a series of diagrams. Such code may generate position values "MyI2C_Regs.xDir", "MyI2C_Regs.yDir", "MyI2C_Regs.zDir" from raw capacitance sense values (initial values for "realCounts[i]"). It is understood that such code represents a demonstration of a sensing operation and device, and should not be construed as limiting to the embodiments disclosed herein.

Figure 21A:
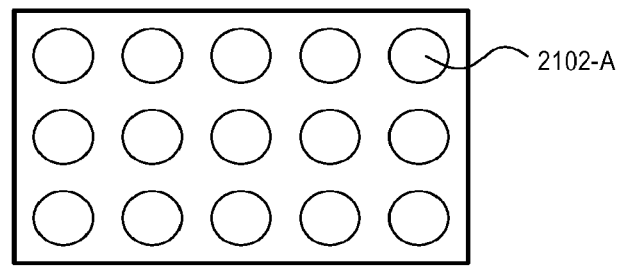
FIGS. 21A to 21C show sensor configurations that may be included in the various embodiments.
Figure 21B:
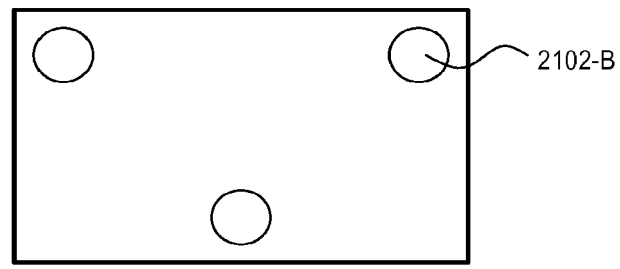
Figure 21C:
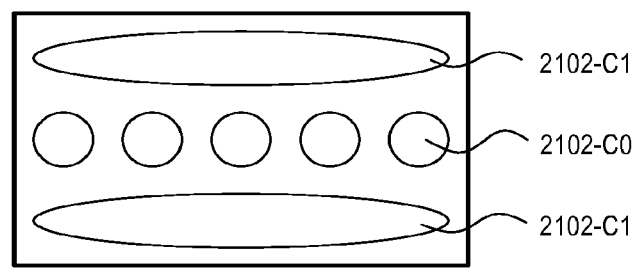

As noted above, while some embodiments include four sensors, other embodiments may include greater or fewer numbers of sensors. Referring now to FIGS. 21A to 21C, sensor configurations according to additional embodiments are shown in plan diagrams.

Referring to FIG. 21A, a sensor configuration according to one embodiment may include a number of sensors (one shown as 2102-A) having a same shape (in this embodiment circular), arranged into a 3×5 array.

Referring to FIG. 21B, a sensor configuration according to another embodiment may include three sensors (one shown as 2102-B) arranged in a triangular fashion. Such sensors may have a same shape.

Referring to FIG. 21C, a sensor configuration according to a further embodiment may include sensors of different shapes. In the very particular embodiment shown, top and bottom sensors (2102-C1 and 2102-C0) may have ellipsoid shapes, extending more in a first direction (horizontal in the view showing), than in a second direction (vertical in the view shown). In addition, a number of smaller sensors (one shown as 2102-C) may be positioned between the larger sensors in a row running in the second direction.

In particular embodiments, such sensors (e.g., 2102-A, 2102-B, 2102-C0/1) may be capacitive sensors formed from a conductive material and arranged in a substantially the same plane. Further, such sensors may be connected to processing circuits (not shown) to derive position information according to embodiments described herein, and equivalents.

Figure 22:
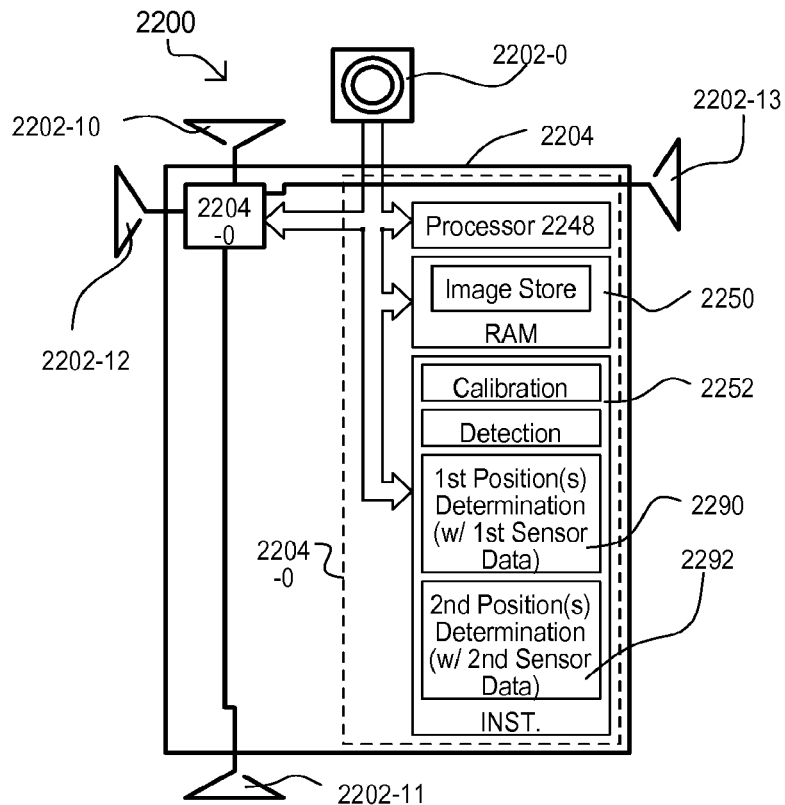
FIG. 22 is a block schematic diagram of a device according to another embodiment.

Referring now to FIG. 22, a system according to a further embodiment is shown in block schematic diagram and designated by the general reference character 2200. A system 2200 may include more than one type of sensor, and utilize sensor data from multiple sensor types to arrive at position data for an object.

Accordingly, embodiments of the invention may utilize combinations of any of the sensing types described herein, where data from all type sensors may be utilized to generate position data for an object without touching the object.

In the very particular embodiment of FIG. 22, a system 2200 may include both capacitive sensors 2202-10 to 2202-13 as well as an image sensor 2202-0. Capacitive sensors (2202-10 to 2202-13) may acquire sensor data according to any of the embodiments described herein. In FIG. 22, an analog portion 2204-0 of processing circuits 2204 may convert raw sensor reading into digital values (e.g., counts) and provide such values to a digital portion 2204-1.

A digital portion 2204-1 may generate position values from sensor data received from both type sensors. In the particular embodiment shown, a processor 2248 may execute predetermined instructions stored within instruction memory 2252 to derive position data from both capacitance sense data and image data stored in operational memory 2250.

An instruction memory 2252 may store routines for execution by processor 2248. In the particular embodiment shown, instruction memory 2252 may store calibration instructions (Calibration), detection instructions (Detection), and two position determination instructions (2290 and 2292). Calibration instructions and detection instructions may operate with processor 2258 as described in conjunction with FIG. 9.

Position determination instructions 2290 may generate one or more position values from first sensor data. That is, data from one sensor type may be used to generate a partial position in a three dimensional detection space. Further, position determination instructions 2292 may generate remaining position values (or complete position values for a three dimensional position), in response to second sensor data.

In one particular embodiment, an image sensor may generate Z position data, while capacitance sensors may generate X-Y position data. Conversely, capacitance sensors may generate Z position data, while an image sensor may generate X-Y position data.

Further, in very particular embodiments, existing features of a device may be used in combination to determine an object position without contacting the object. As but one very particular embodiment, an existing touch interface (used to input user data by finger touches, etc.) may acquire some position data, while an existing camera or video recorder (used to record image data for later viewing) on the same device may acquire image data utilized to determine an overall three dimensional position (or change in position).

Figure 23:
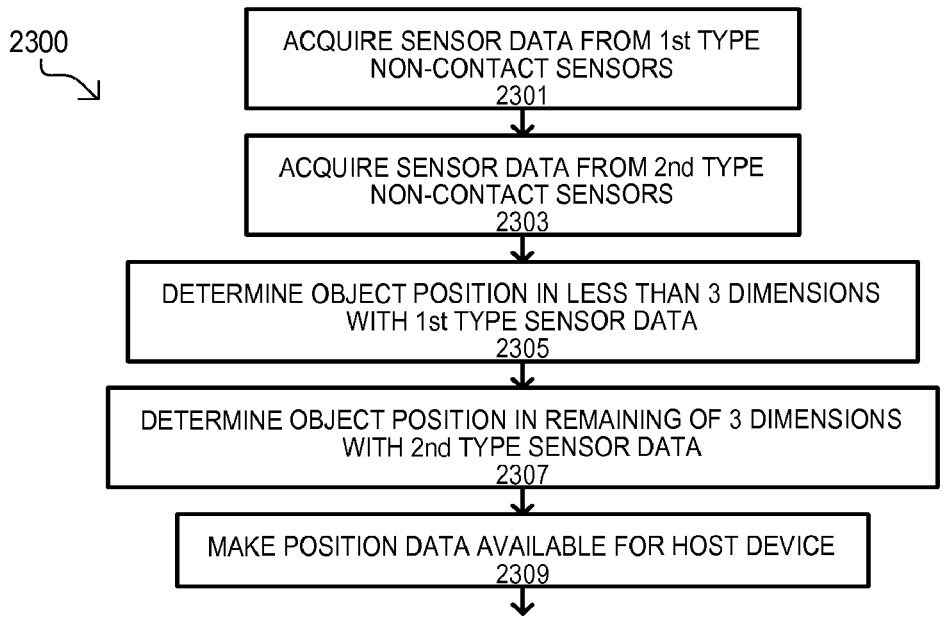
FIG. 23 is a flow diagram of a method according to an embodiment.

Referring now to FIG. 23, a method according to an embodiment is shown in a flow diagram and designated by the general reference character 2300. A method 2300 may include acquiring sensor data from first type non-contact sensors (box 2301). Sensor data may also be acquired from second type non-contact sensors (box 2303). It is noted that non-contact sensors may not contact a detected object in a three dimensional position determination operation. However, such sensors may contact objects in a different mode. As but one example, in a 3D position detection mode, a touchscreen application may detect an object in front of (but not contacting) the touchscreen. However, in touch input mode, a user may contact the surface to control the device in certain applications.

A method 2300 may also include determining object position in less than three dimensions with first type sensor data (box 2305). A position in a remaining of the three dimensions may be determined with second type sensor data (box 2307). Such position data may be made available for a host device (box 2309).

It should be appreciated that in the foregoing description of exemplary embodiments, various features are sometimes grouped together in a single embodiment, figure, or description thereof for the purpose of streamlining the disclosure aiding in the understanding of one or more of the various aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, each claim following the detailed description stands on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A device comprising:
   a plurality of sensors substantially coplanar with one another in a sensor plane, each sensor to generate a sense value, which varies according to a physical distance between that sensor and an object; and
   control circuits configured to generate a first position value, a second position value, and a third value using the sense values in a first mode to detect a hover or glove operation, the first position value and second position value identifying a two-dimensional position of the object in the sensor plane and the third value identifying a distance of the object in an axis substantially perpendicular to the sensor plane, wherein the control circuits are further configured to generate a fourth position value and a fifth position value using additional sense values from the plurality of sensors in a second mode to detect a touch operation, the fourth position value and the fifth position value identifying a second two-dimensional position of the object in the sensor plane, wherein the control circuits comprise a programmable integrated circuit comprising:

an analog portion configured to acquire the sense value at each sensor and convert the sense value to a numerical sensor count value; and a digital portion comprising arithmetic logic circuits configured to calculate the first position value, the second position value, and the third value from the numerical sensor count values in the first mode and to calculate the fourth position value and the fifth position value from the numerical sensor count values in the second mode.

2. The device of claim 1, wherein the plurality of sensors comprises capacitive sensors, and the physical distance between each capacitive sensor and the object varies a capacitance of each capacitive sensor by capacitive coupling.

3. The device of claim 1, further comprising at least one stimulus circuit configured to generate a signal configured to interact with the object and is to be detected by the plurality of sensors.

4. The device of claim 3, wherein the at least one stimulus circuit and plurality of sensors are included in a system, wherein the system comprises at least one of:

an acoustic system comprising a stimulus circuit configured to generate a sound signal and acoustic transducers configured to detect the sound signal reflecting off the object, ultrasonic systems comprising a stimulus circuit configured to generate an ultrasonic signal and acoustic transducers configured to detect the ultrasonic signal reflecting off the object, or light detection systems comprising a stimulus circuit configured to generate light and light detectors configured to detect the light reflecting off the object.

5. The device of claim 1, wherein the third value is a third position value, and wherein the first position value, second position value and third position value identify a three-dimensional position of the object in a space adjacent to the sensor plane.

6. The device of claim 1, wherein the analog portion comprises inputs connected to each sensor configured to be selectively connected to a common sense node by input switches, an analog-to-digital conversion circuit configured to convert the sense value at the common sense node into a digital value, and the digital portion comprises a processor configured to execute instructions stored in an instruction memory.

7. The device of claim 1, wherein the plurality of sensors comprises:

a first sensor and a second sensor aligned along a first axis, and a third sensor and a fourth sensor aligned along a second axis different than the first axis, and wherein the control circuits are configured to generate the first position value using the sense values of the first and second sensors, generate the second position value using the sense values of the third and fourth sensors, and generate the third value using the sense values of the first, second, third and fourth sensors.

8. The device of claim 1, wherein the plurality of sensors comprise at least a first sensor, a second sensor, and a third sensor, and wherein the control circuits are configured to generate the first position value, second position value and third value with trilateration using the sense values of the first, second, and third sensors.

9. The device of claim 1, wherein the device comprises a device surface substantially coplanar with the sensor plane, and the plurality of sensors are positioned on a periphery of the device surface.

10. The device of claim 1, wherein the device comprises a device surface substantially coplanar with the sensor plane, and the sensor plane comprises a touch surface of a touchscreen.

11. The device of claim 1, further comprising communication circuits configured to output the first position value, second position value, and third value in a predetermined format to a host device, wherein the host comprises an electronic device comprising a user interface coupled to the control circuits.

12. The device of claim 1, wherein the device is a portable computing device, wherein the portable computing device is at least one of a tablet computer or a mobile phone.

13. A method, adapted to a device comprising a plurality of sensors and a programmable integrated circuit having an analog portion and a digital portion, wherein the sensors are aligned in a sensor plane, and wherein the method comprises:

generating, by each of the sensors, sensor data, wherein the sensor data generated by each of the sensors varies according to a physical distance between that sensor and an object;

acquiring, by the analog portion of the programmable integrated circuit in a first mode, the sensor data from the sensors;

detecting, by the digital portion of the programmable integrated circuit in the first mode, a hover or glove operation by the object in a detection space above the sensor plane using the sensor data;

acquiring, by the analog portion of the programmable integrated circuit in a second mode, additional sensor data from the sensors; and detecting, by the digital portion of the programmable integrated circuit in the second mode, a touch operation by the object in the detection space above the sensor plane using the additional sensor data, and wherein detecting the hover or glove operation comprises:

detecting, by the digital portion, differences between a first plurality of positions of the object in a first dimension extending from the sensor plane using the sensor data; and detecting, by the digital portion, differences between a second plurality of positions of the object in a second dimension and a third dimension in another plane that is substantially parallel with the sensor plane using the sensor data, wherein the sensors comprise a first sensor and a second sensor aligned along a first axis, and a third sensor and a fourth sensor aligned along a second axis different than the first axis, and the detecting the differences between the second plurality of positions of the object in the other plane comprises generating a first position value from sensor data from the first and second sensors, and generating a second position value from sensor data from the third and fourth sensors.

14. The method of claim 13, further comprising:

in the second mode, detecting, by the digital portion of the programmable integrated circuit, a presence of the object in the touch operation in the detection space above the sensor plane; and detecting, by the digital portion of the programmable integrated circuit in the second mode, differences between a third plurality of positions of the object in the touch operation in the second dimension and the third dimension in the other plane that is substantially parallel with the sensor plane using the additional sensor data, and the detecting the differences between the third plurality of positions of the object in the other plane comprises generating a fourth position value from additional sensor data from the first and second sensors, and generating a fifth position value from additional sensor data from the third and fourth sensors.

15. The method of claim 14, wherein the detecting the differences between the first plurality of positions of the object in the first dimension comprises an arithmetic operation with the sensor data from the sensors, and the detecting the second plurality of positions of the object in the other plane that is substantially parallel with the sensor plane comprises deriving two position values, each position value being generated with the sensor data from less than all of the sensors.

16. The method of claim 14, wherein the detecting the differences between the first plurality of positions of the object in the first dimension comprises a trilateration operation with values generated in response to the sensor data.

17. The method of claim 13, wherein the acquiring the sensor data from the sensors comprises sequentially generating a count value for each sensor, each count value corresponding to a charge rate of the sensor due to a capacitance of the sensor.

18. A device comprising:
a first sensor configured to generate first proximity data for an object in a detection space adjacent to a device body;
a second sensor configured to generate second proximity data for the object in the detection space;
a third sensor configured to generate third proximity data for the object in the detection space;
a fourth sensor configured to generate fourth proximity data for the object in the detection space; and
processing circuits configured to determine a two-dimensional position of the object in a first plane of the detection space using at least two of the first proximity data, the second proximity data, the third proximity data, and the fourth proximity data and to determine movement of the object in a first direction substantially perpendicular to the first plane using at least two of the first proximity data, the second proximity data, the third proximity data, and the fourth proximity data, wherein the processing circuits are further configured to detect a hover or glove operation in a first mode using the two-dimensional position of the object in the first plane and the movement of the object in the first direction, and wherein the processing circuits are further configured to detect a touch operation in a second mode using the two-dimensional position of the object in the first plane.

19. The device of claim 18, wherein the first sensor is configured to sense a different physical quality to generate the first proximity data than the second sensor senses to generate the second proximity data, wherein the third sensor is configured to sense a different physical quality to generate the third proximity data than the fourth sensor senses to generate the fourth proximity data.

20. The device of claim 18, wherein the first sensor comprises first one or more capacitance sensors, the second sensor comprises a first image sensor, the third sensor comprises second one or more capacitance sensor, and the fourth sensor comprises a second image sensor, and wherein the processing circuits.

* * * * *